US011896539B2

(12) United States Patent
Wang

(10) Patent No.: US 11,896,539 B2
(45) Date of Patent: Feb. 13, 2024

(54) INVERSION TABLE

(71) Applicant: BETO ENGINEERING AND MARKETING CO., LTD., Taichung (TW)

(72) Inventor: Lopin Wang, Taichung (TW)

(73) Assignee: BETO ENGINEERING AND MARKETING CO., LTD., Taichung (TW)

( * ) Notice: Subject to any disclaimer, the term of this patent is extended or adjusted under 35 U.S.C. 154(b) by 279 days.

(21) Appl. No.: 17/566,097

(22) Filed: Dec. 30, 2021

(65) Prior Publication Data

US 2023/0104572 A1 Apr. 6, 2023

(30) Foreign Application Priority Data

Oct. 5, 2021 (TW) ................................ 110137051

(51) Int. Cl.
*A61H 1/02* (2006.01)
*A63B 23/00* (2006.01)

(52) U.S. Cl.
CPC .......... *A61H 1/0218* (2013.01); *A63B 23/00* (2013.01); *A61H 2201/0192* (2013.01); *A61H 2201/1642* (2013.01); *A61H 2203/0493* (2013.01); *A63B 2023/006* (2013.01)

(58) Field of Classification Search
CPC .......... A61H 1/0218; A61H 2201/0192; A61H 2201/1642; A61H 2203/0493; A61H 1/0229; A61H 2201/0138; A61H 2201/1635; A61H 2201/1676; A61H 1/0292; A61H 2201/1619; A61H 2201/1628; A61H 2201/164; A61H 2201/1669; A61H 1/02; A61H 1/0222; A61H 2203/0481; A63B 23/00;
(Continued)

(56) References Cited

U.S. PATENT DOCUMENTS 4,232,662 A * 11/1980 Barber ................ A61H 1/0218
606/244
7,077,795 B2 * 7/2006 Chen .................. A61H 1/0218
482/145

(Continued)

*Primary Examiner* — Joshua Lee
*Assistant Examiner* — Catrina A Letterman
(74) *Attorney, Agent, or Firm* — Muncy, Geissler, Olds & Lowe, P.C.

(57) ABSTRACT

An inversion table includes a supporting stand, a tilt inversion mechanism and an operating unit. The tilt inversion mechanism includes an inversion unit including a support table assembly which is pivotally disposed on the supporting stand, and an extension assembly which is coupled with and extends from the support table assembly downwardly. A feet holding unit includes a front feet holding assembly securely and non-pivotably disposed on a lower portion of the inversion unit, and a rear feet holding assembly pivotably and movably connected to the inversion unit. The operating unit includes an operating assembly operably coupled with the front feet holding assembly, and is rotatable about a rotating axis at the front feet holding assembly to actuate the rear feet holding assembly to rotate and move toward the front feet holding assembly. In an inversion state, the users feet is firmly held on the front feet holding assembly.

11 Claims, 9 Drawing Sheets

(58) Field of Classification Search
CPC .......... A63B 2023/006; A63B 23/0238; A63B 21/068; A63B 21/4047
USPC ......................................... 482/143, 144, 145
See application file for complete search history.

(56) References Cited

U.S. PATENT DOCUMENTS

| | | | | |
|---|---|---|---|---|
| 7,081,073 | B1 * | 7/2006 | Smith | A61H 1/0218 482/145 |
| 2003/0153442 | A1 * | 8/2003 | Kuo | A61H 1/0218 482/144 |
| 2008/0280739 | A1 * | 11/2008 | Wu | A61H 1/0218 482/145 |
| 2009/0249589 | A1 * | 10/2009 | Wu | A61H 1/0218 24/457 |
| 2013/0079204 | A1 * | 3/2013 | Wang | A61H 1/0222 482/144 |
| 2014/0274625 | A1 * | 9/2014 | Chen | A61H 1/0229 482/144 |
| 2017/0119612 | A1 * | 5/2017 | Wang | A61H 1/001 |
| 2017/0128309 | A1 * | 5/2017 | Chen | A47C 7/52 |
| 2018/0147107 | A1 * | 5/2018 | Leier | A61H 1/0222 |
| 2018/0338882 | A1 * | 11/2018 | Pena | A61H 1/0292 |

* cited by examiner

INVERSION TABLE

CROSS-REFERENCE TO RELATED APPLICATION

This application claims priority of Taiwanese Patent Application No. 110137051, filed on Oct. 5, 2021.

FIELD

The disclosure relates to an inversion table, and more particularly to an inversion table including a foot holding unit for holding the feet of a user.

BACKGROUND

An inversion table generally includes a tilt inversion mechanism rotatable rearwardly relative to a supporting stand, a rear feet holding mechanism securely disposed to a rear of the supporting stand, and a front feet holding mechanism controllably and rotatably connected to a front of the supporting stand. During usage of the inversion table, a user stands on a feet retaining plate of the tilt inversion mechanism, then turns the front feet holding mechanism rearwardly to hold and grip the feet cooperatively with the rear feet holding mechanism, and locks the front feet holding mechanism. At this stage, the user can safely rotate the tilt inversion mechanism to an inversion state for doing an inverted activity.

During the turning to the inversion state, the user's weight is entirely applied to the front feet holding mechanism since the user is fixed on the inversion table by gripping of the insteps with the front feet holding mechanism. However, due to the pivotable and movable front feet holding mechanism which has clearances between pivotable and movable component parts thereof, an unstable sway and shaking are generated, which causes a feeling of unsafety.

SUMMARY

Therefore, an object of the disclosure is to provide an inversion table that can alleviate at least one of the drawbacks of the prior art.

According to the disclosure, the inversion table includes a supporting stand, a tilt inversion mechanism and an operating unit. The tilt inversion mechanism includes an inversion unit and a feet holding unit. The inversion unit includes a support table assembly and an extension assembly. The support table assembly is pivotally disposed on an upper portion of the supporting stand. The extension assembly is coupled with and extends from the support table assembly downwardly in a lengthwise direction. The feet holding unit includes a front feet holding assembly and a rear feet holding assembly. The front feet holding assembly is securely and non-pivotably disposed on a lower portion of the inversion unit. The rear feet holding assembly is pivotably and movably connected to the inversion unit. The operating unit includes an operating assembly. The operating assembly is operably coupled with the front feet holding assembly, and is rotatable relative to the front feet holding assembly about a rotating axis at the front feet holding assembly to actuate the rear feet holding assembly to rotate and move toward the front feet holding assembly.

Preferably, the inversion table further includes at least one safety locking mechanism.

With the front feet holding assembly that is secure relative to the inversion unit without any pivotally connecting structure, when the tilt inversion mechanism is turned to an inversion state, the whole weight of the user is supported on the fixed front feet holding assembly without the pivotally connecting structure and the clearances between pivotable and movable component parts thereof, which prevents generation of an unstable sway, shaking and a feeling of unsafety.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
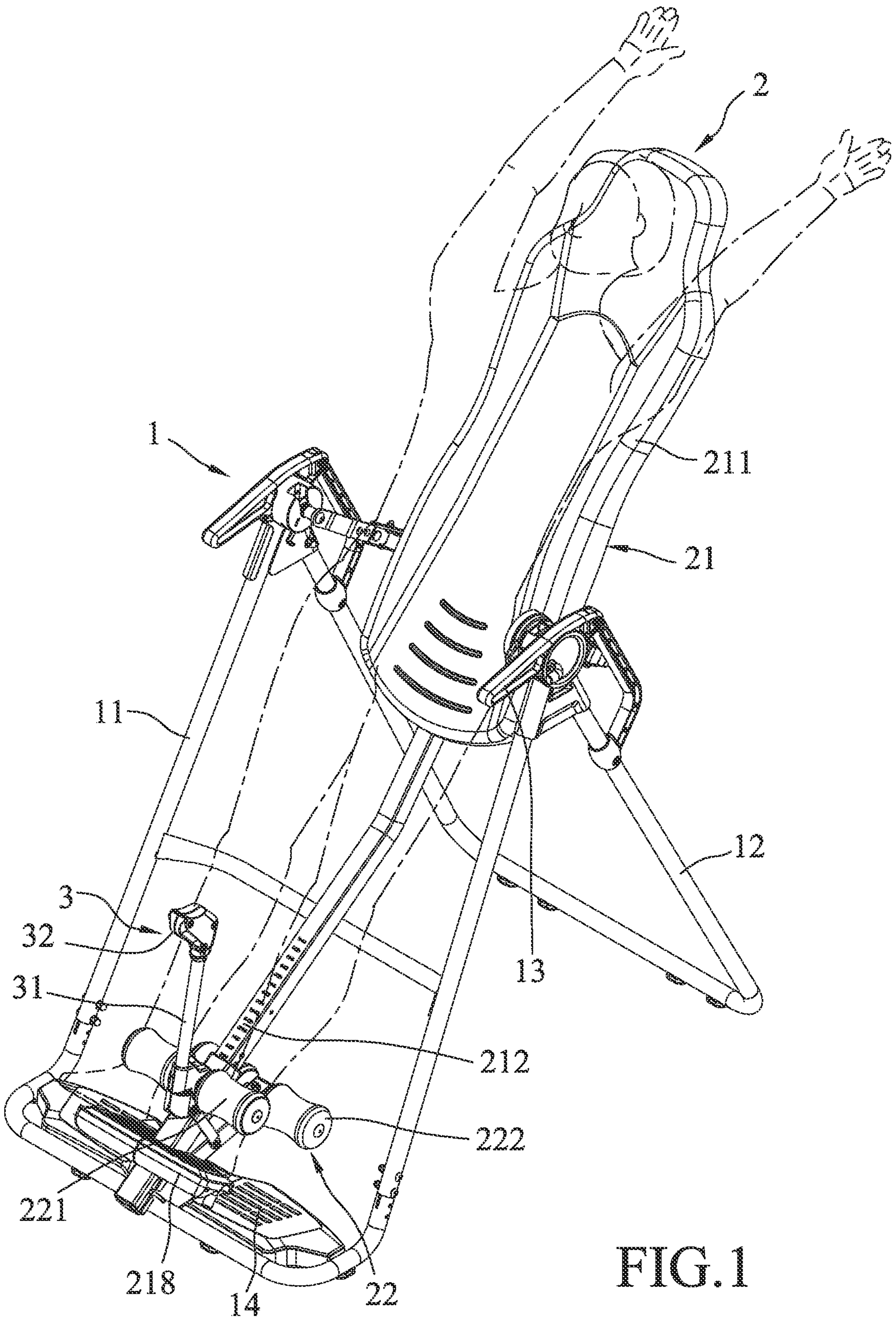
FIG. 1 is a perspective view illustrating an embodiment of an inversion table according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
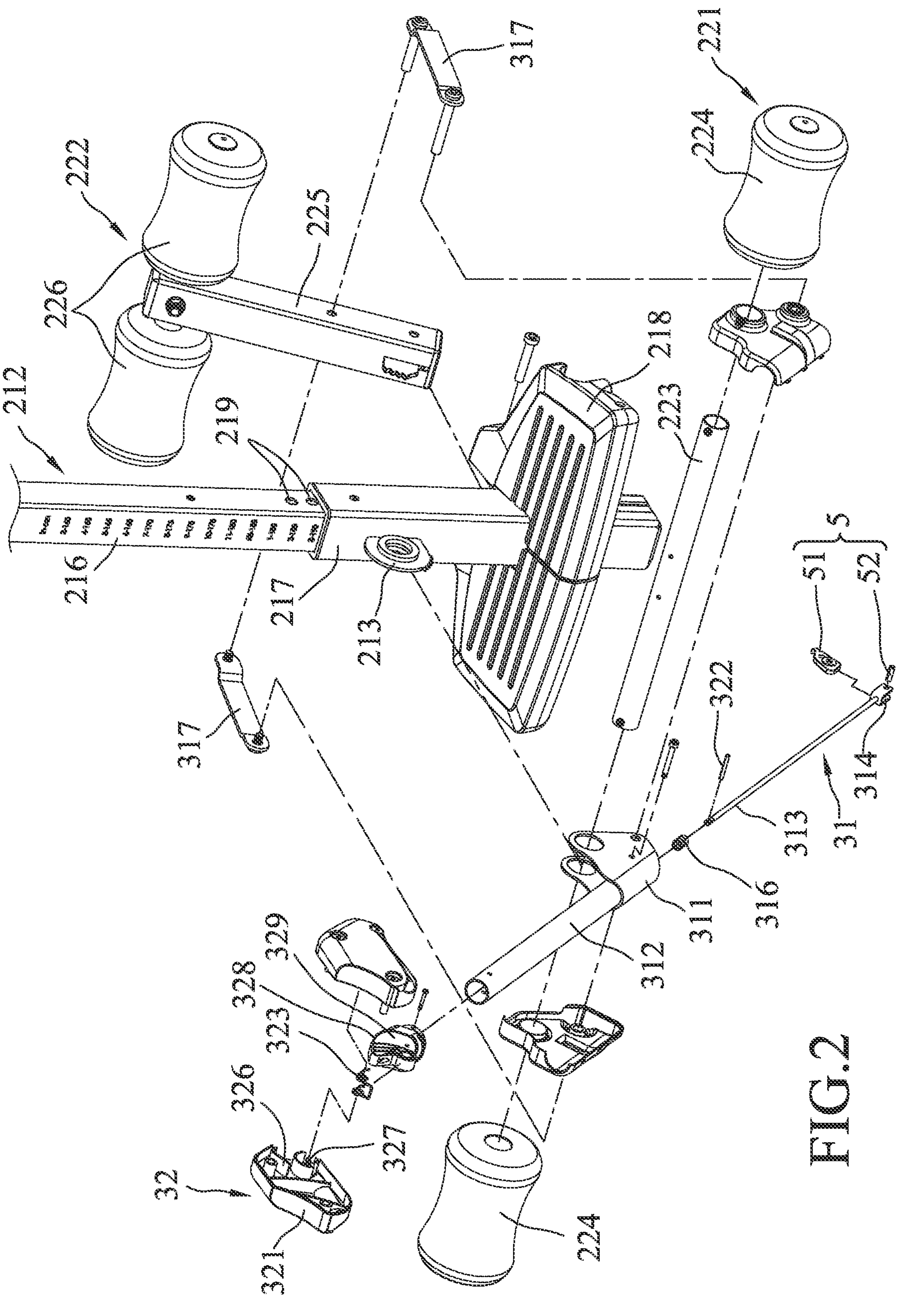
FIG. 2 is a fragmentary, exploded perspective view of the embodiment.

Referring to FIGS. 1 and 2, an embodiment of an inversion table is used by a user to do an inverted activity, and includes a supporting stand 1, a tilt inversion mechanism 2 and an operating unit 3.

The supporting stand 1 includes a front supporting stand portion 11 and a rear supporting stand portion 12 for supporting the tilt inversion mechanism 2.

The tilt inversion mechanism 2 includes an inversion unit 21 and a feet holding unit 22.

The inversion unit 21 includes a support table assembly 211, an extension assembly 212 and a toothed wheel 213. The support table assembly 211 is pivotally disposed on an upper portion of the supporting stand 1.

With reference to FIGS. 1 to 3 and FIG. 5, the extension assembly 212 is coupled with and extends from the support table assembly 211 downwardly in a lengthwise direction. The extension assembly 212 includes an inner tube 216, an outer tube 217, a fastening assembly 4 and a feet retaining plate 218. The inner tube 216 is in the form of a square tube, and is securely connected with a lower end of the support table assembly 211. The inner tube 216 has a plurality of adjusting holes 219 spaced apart from each other in the lengthwise direction. The outer tube 217 is also in the form of a square tube, and is movably sleeved around the inner tube 216 and slidable relative to the inner tube 216. The outer tube 217 has a fastening hole 210 which is alignable with a selected one of the adjusting holes 219. The fastening assembly 4 is disposed to releasably fasten the outer tube 217 to the inner tube 216 (a detailed description will be provided hereinafter). The feet retaining plate 218 is securely disposed on the outer tube 217.

The toothed wheel 213 is securely disposed on a front of the outer tube 217, and has a plurality of teeth 200 around an outer periphery thereof.

Figure 3:
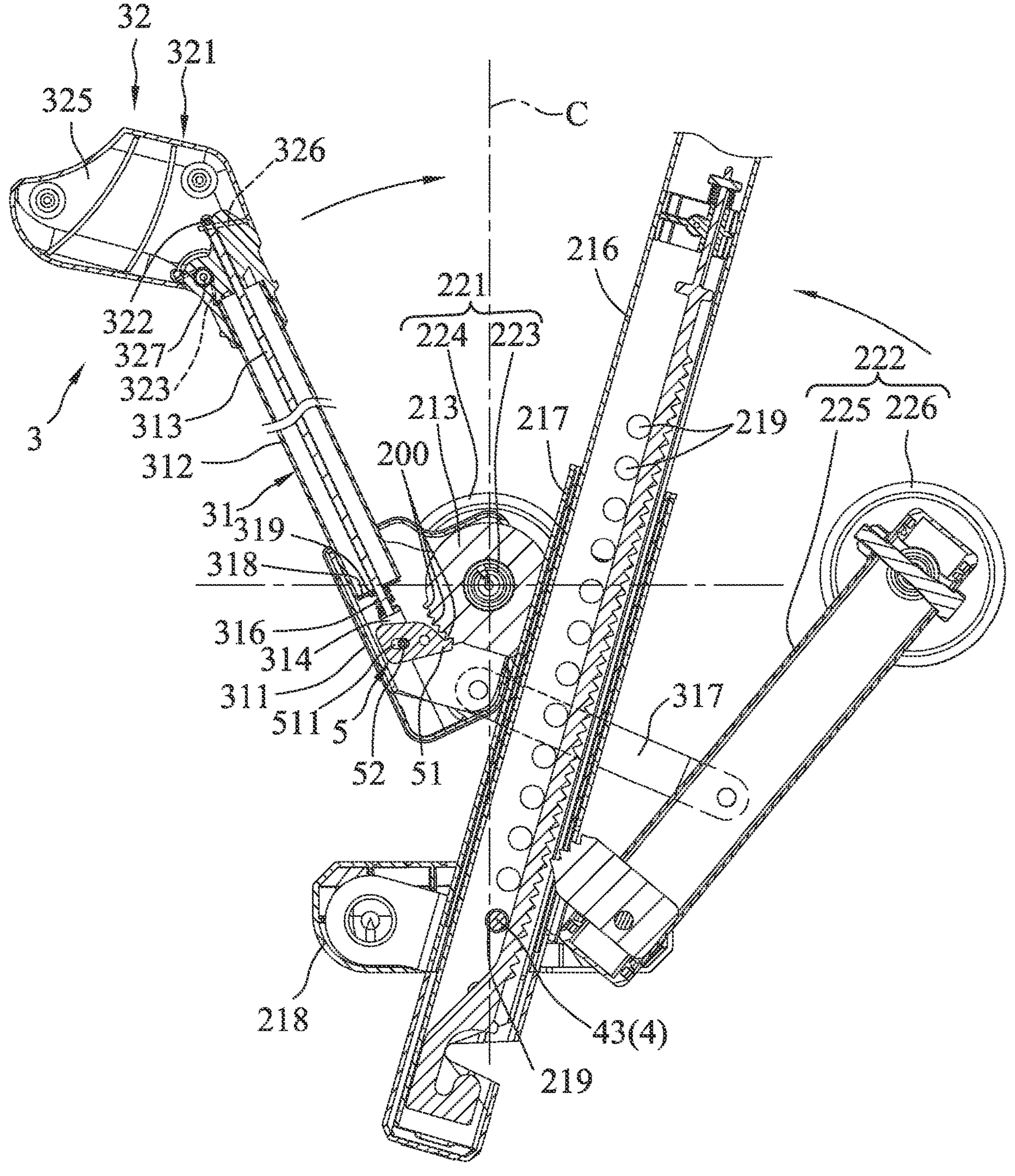
FIG. 3 is a fragmentary sectional view of the embodiment, illustrating when a feet holding unit is in a non-used state.
Figure 4:
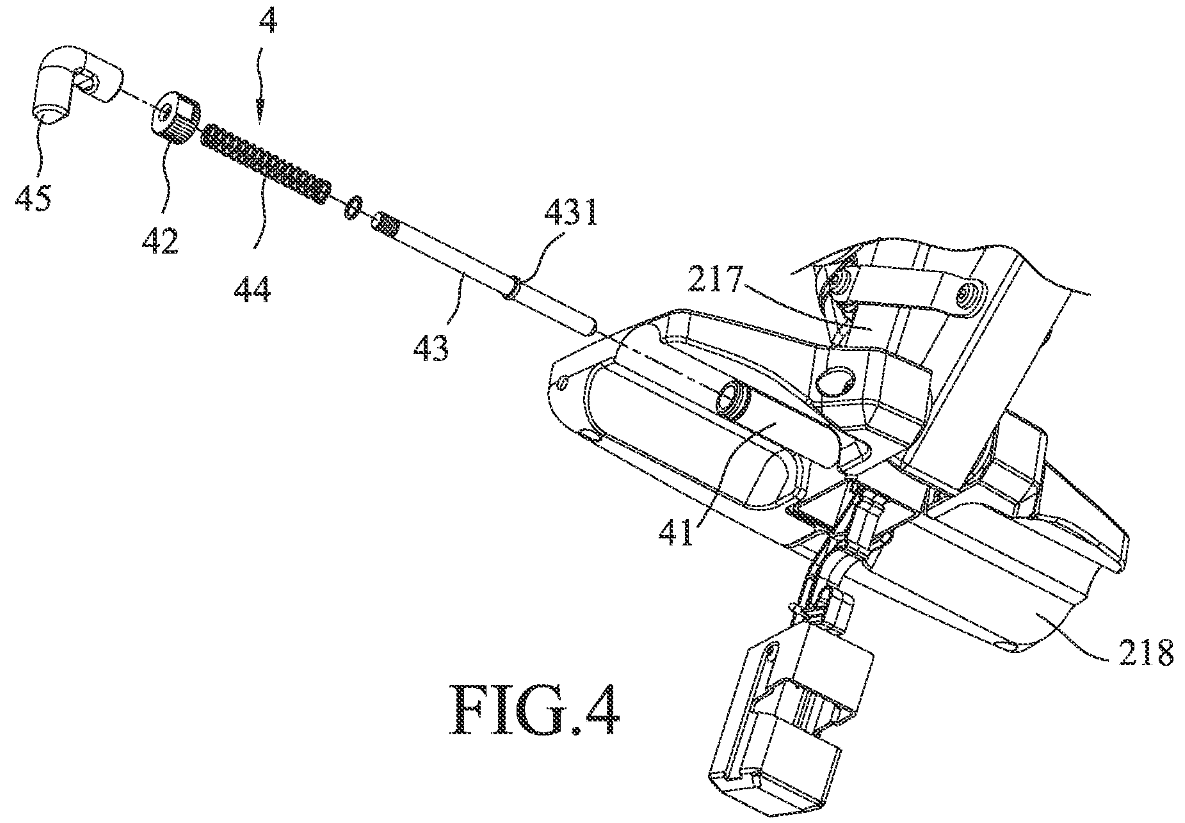
FIG. 4 is a fragmentary, exploded perspective view of a fastening assembly of the embodiment.
Figure 5:
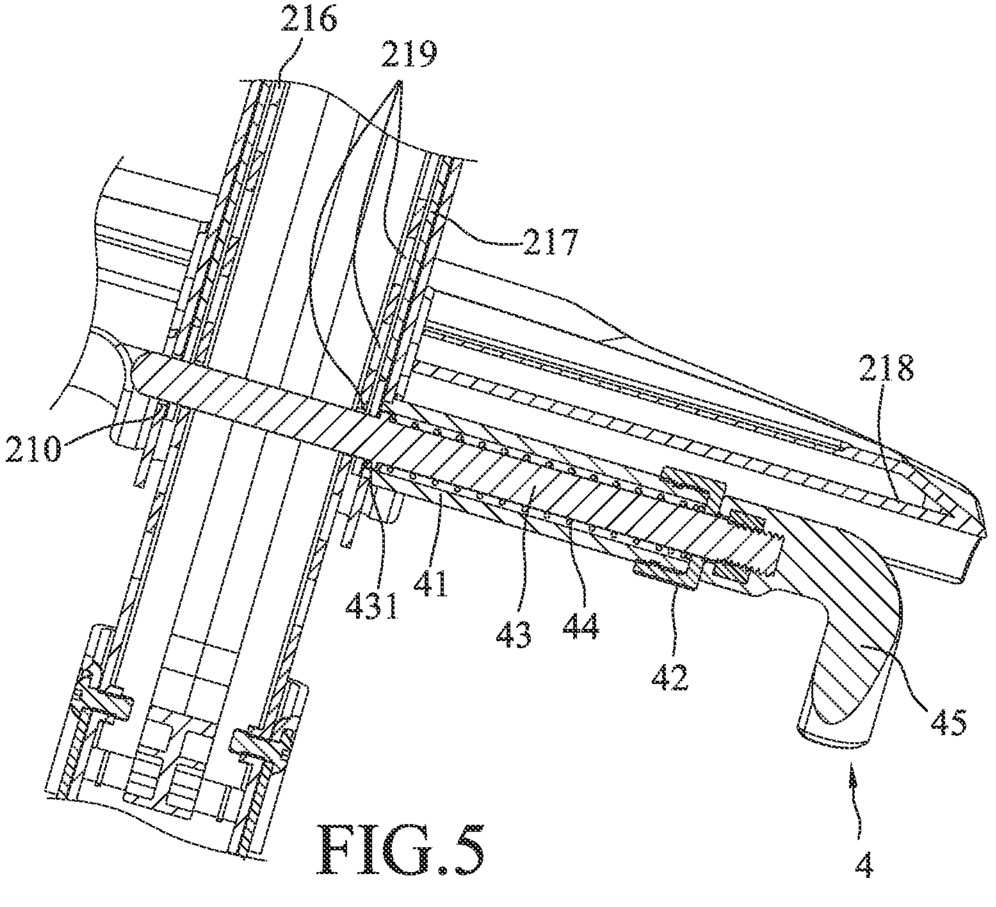
FIG. 5 is a fragmentary sectional view of the fastening assembly of the embodiment.

With reference to FIGS. 3 to 5, the fastening assembly 4 includes an extension tube 41, an abutting nut 42, an insert pin 43, a positioning spring 44 and a pull handle 45. The extension tube 41 is securely disposed on the outer tube 217. The abutting nut 42 is threadedly engaged with an end of the extension tube 41. The insert pin 43 is movably inserted into the extension tube 41 and has an abutting flange 431. The insert pin 43 has an end disposed to extend through one of the adjusting holes 219 and the fastening hole 210 to position the outer tube 217 relative to the inner tube 216. The positioning spring 44 is sleeved around the insert pin 43 and abuts against the abutting nut 42 and the abutting flange 431 to urge the insert pin 43 to extend through the one adjusting hole 219 and the fastening hole 210. The pull handle 45 is threadedly engaged with an opposite end of the insert pin 43 and is disposed outwardly of the extension tube 41.

The outer tube 217 is slidable relative to the inner tube 216, and is fastened to a desired height position by means of the fastening assembly 4. When it is desired to adjust the length of the extension assembly 212, the insert pin 43 is pulled away from the inner tube 216 to disengage from the adjusting hole 219 and the fastening hole 210 to permit movement of the outer tube 217, and is returned to engage with the selected adjusting hole 219 and the fastening hole 210 by the biasing force of the positioning spring 44.

With reference to FIGS. 1 to 3, the feet holding unit 22 includes a front feet holding assembly 221 and a rear feet holding assembly 222. The front feet holding assembly 221 includes a front shaft 223 and a front ankle abutting member 224. The front shaft 223 extends through the toothed wheel 213 in a direction transverse to the lengthwise direction to serve as a rotating axis. The front ankle abutting member 224 is securely disposed on the front shaft 223. The rear feet holding assembly 222 includes a rear shaft 225 and a rear ankle abutting member 226. The rear shaft 225 is pivotably connected to a rear of the feet retaining plate 218 and engages with a lower portion of the extension assembly 212. The rear ankle abutting member 226 is disposed on an upper end of the rear shaft 225.

The operating unit 3 includes an operating assembly 31 and a handgrip assembly 32. The operating assembly 31 is disposed on the outer tube 217, and includes a mounting member 311, a sleeve tube 312, an elongated pull member 313, a pivoted portion 314, a retaining member 5, a biasing spring 316 and at least one linkage member 317. The mounting member 311 is in the form of a hollow shell and is securely connected to a lower end portion of the sleeve tube 312. The front shaft 223 securely extends through the mounting member 311. The sleeve tube 312 has an abutting portion 318 and a through hole 319 at a lower end thereof. The pull member 313 is in the form of a long rod which is movably disposed in the sleeve tube 312 and which has an upper end that extends outwardly of the sleeve tube 312, and a lower end that extends outwardly of the sleeve tube 312 through the through hole 319. The pivoted portion 314 is of a U-shape, and is disposed on the lower end of the pull member 313.

With reference to FIGS. 2 and 3, the retaining member 5 has an elongated hole 511, a meshing portion 51 and a pivot pin 52. The pivot pin 52 extends through the elongated hole 511 and is connected to the pivoted portion 314 such that the retaining member 5 is pivotably connected to the pivoted portion 314. The biasing spring 316 is sleeved around the pull member 313 and abuts against the abutting portion 318 at the lower end of the sleeve tube 312 and the pivoted portion 314 to bias the pivoted portion 314 away from the sleeve tube 312 so as to bring the meshing portion 51 into meshing with the teeth 200 of the toothed wheel 213. The at least one linkage member 317 is pivotally connected between one of the front feet holding assembly 221 and the mounting member 311, and the rear shaft 225 of the rear feet holding assembly 222. In this embodiment, the operating assembly 31 includes two of the linkage members 317 which are respectively and pivotally connected to two sides of the mounting member 311 and the rear shaft 225.

Thus, the operating assembly 31 is operably coupled with the front feet holding assembly 221, and is rotatable relative to the front feet holding assembly 221 about the rotating axis at the front shaft 223 of the front feet holding assembly 221 to actuate the rear feet holding assembly 222 through the at least one linkage member 317 to rotate and move toward the front feet holding assembly 221.

The handgrip assembly 32 includes a handgrip housing 321, a mounting block 328, a positioning pin 322 and a returning spring 323. The handgrip housing 321 defines a receiving space 325 therein. The mounting block 328 is securely connected to the upper end portion of the sleeve tube 312, and has a spring abutting surface 329. The handgrip housing 321 has a rib 326 disposed in the receiving space 325, and a spring-biased pivot portion 327 which is pivotably connected to the mounting block 328. The positioning pin 322 is connected to and extends transverse to the upper end of the pull member 313, and is movably disposed on the rib 326 so as to move the pull member 313 in a limited course. The returning spring 323 is disposed on the spring-biased pivot portion 327, and has an end abutting against the handgrip housing 321, and an opposite end abutting against the spring abutting surface 329. Thus, the handgrip housing 321 is pivotably and operably disposed on the upper end portion of the sleeve tube 312 to be angularly moved about the spring-biased pivot portion 327.

Figure 6:
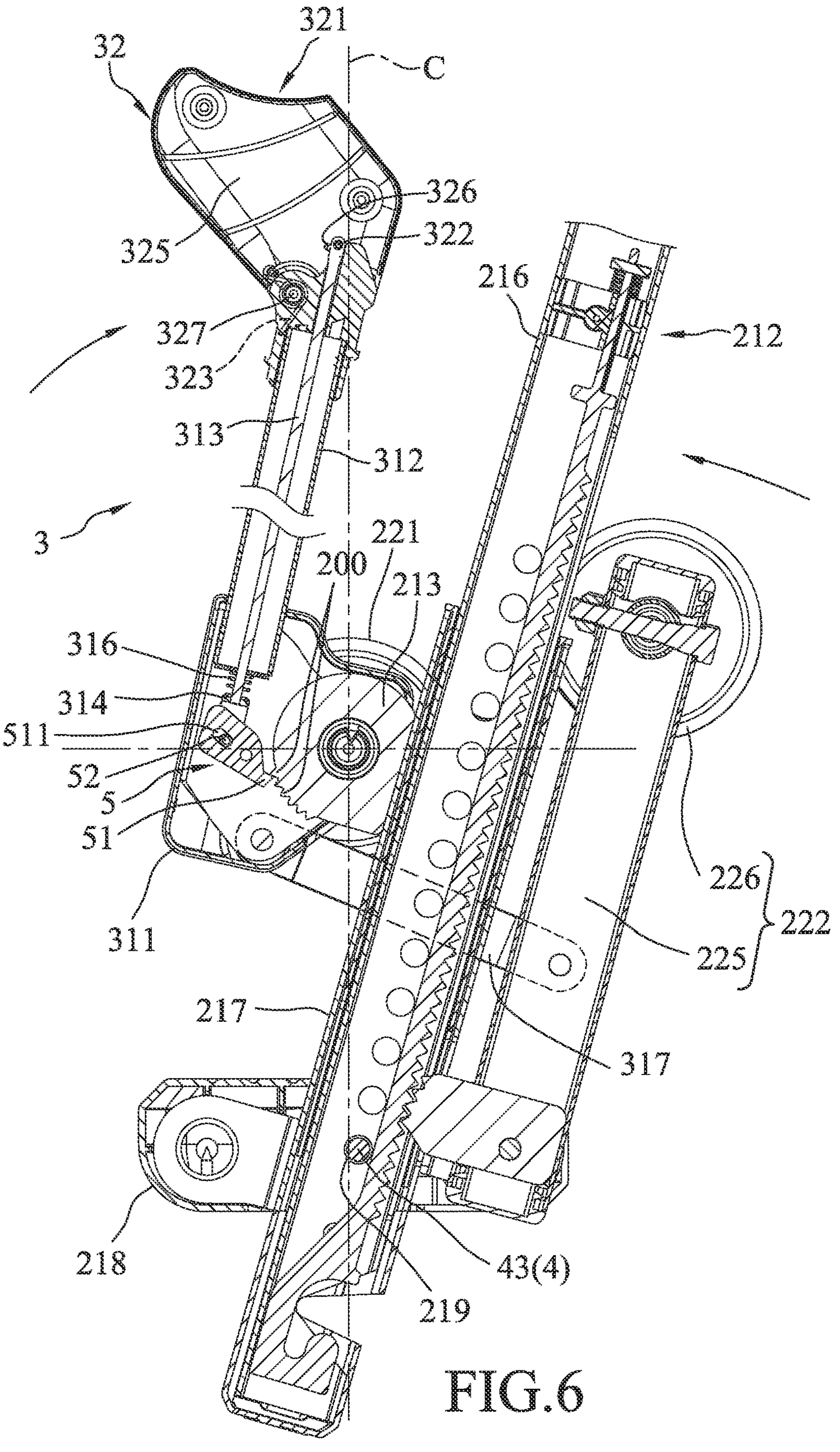
FIG. 6 is a fragmentary sectional view of the embodiment, illustrating when the feet holding unit is in a feet-holding state.
Figure 7:
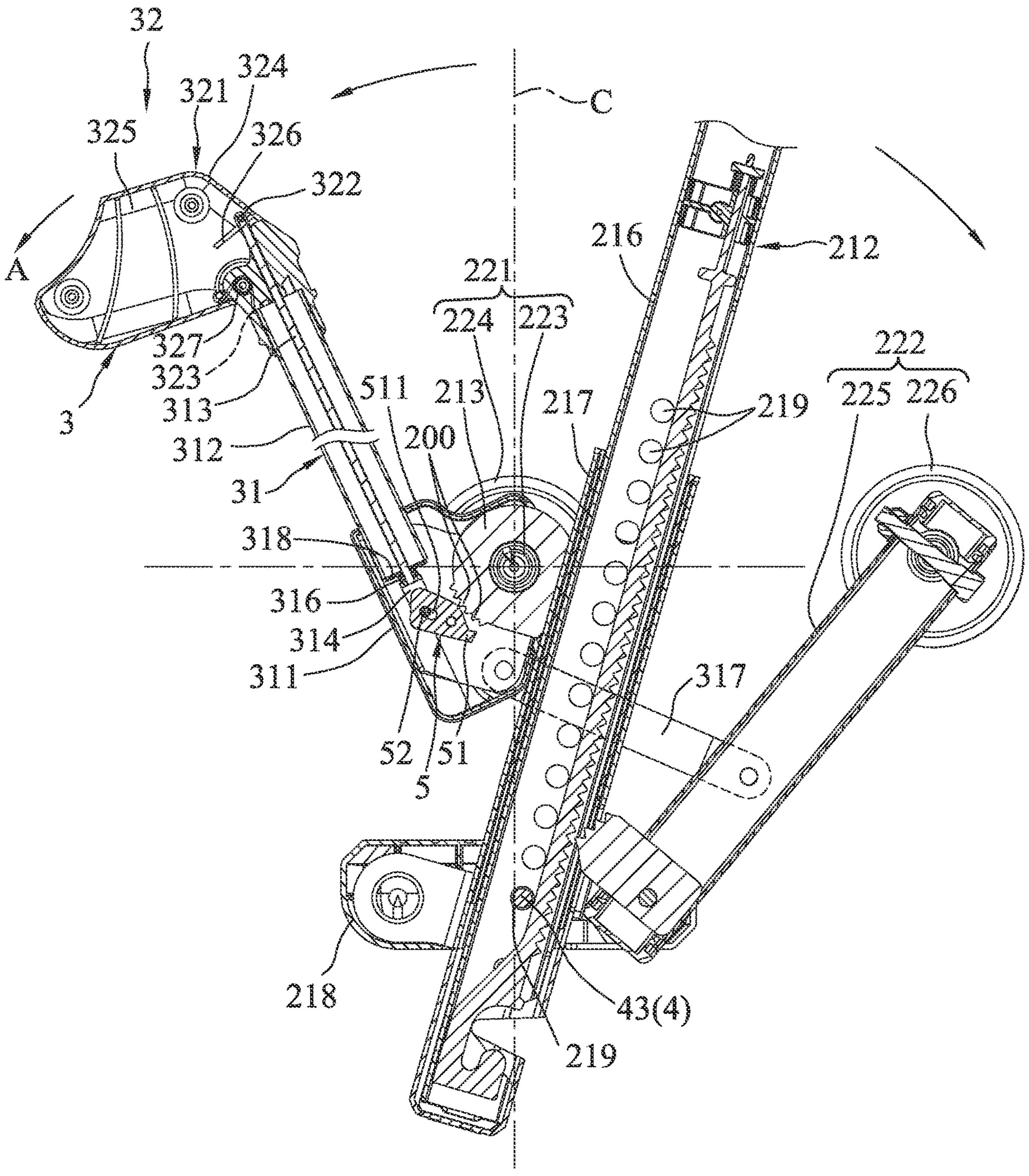
FIG. 7 is a fragmentary sectional view of the embodiment, illustrating when the feet holding unit is operated to be in a released state.

With reference to FIGS. 3, 6 and 7, when the inversion table is in a non-used state, the meshing portion 51 meshes with a lower part of the teeth 200. When the operating assembly 31 is operated to move toward a central direction (C) that passes through the center of the toothed wheel 213, and the rear feet holding assembly 222 is actuated through the at least one linkage member 317 to rotate and move toward the central direction (C) to hold and grip the feet of the user cooperatively with the front feet holding assembly 221, the inversion table is moved to a feet-holding state. At this stage, the meshing portion 51 meshes with an upper part of the teeth 200. When it is desired to release the inversion table from the feet-holding state, the handgrip assembly 32 is applied with a force along a direction (A) to actuate the pull member 313 to disengage the meshing portion 51 from the teeth 200.

Figure 8:
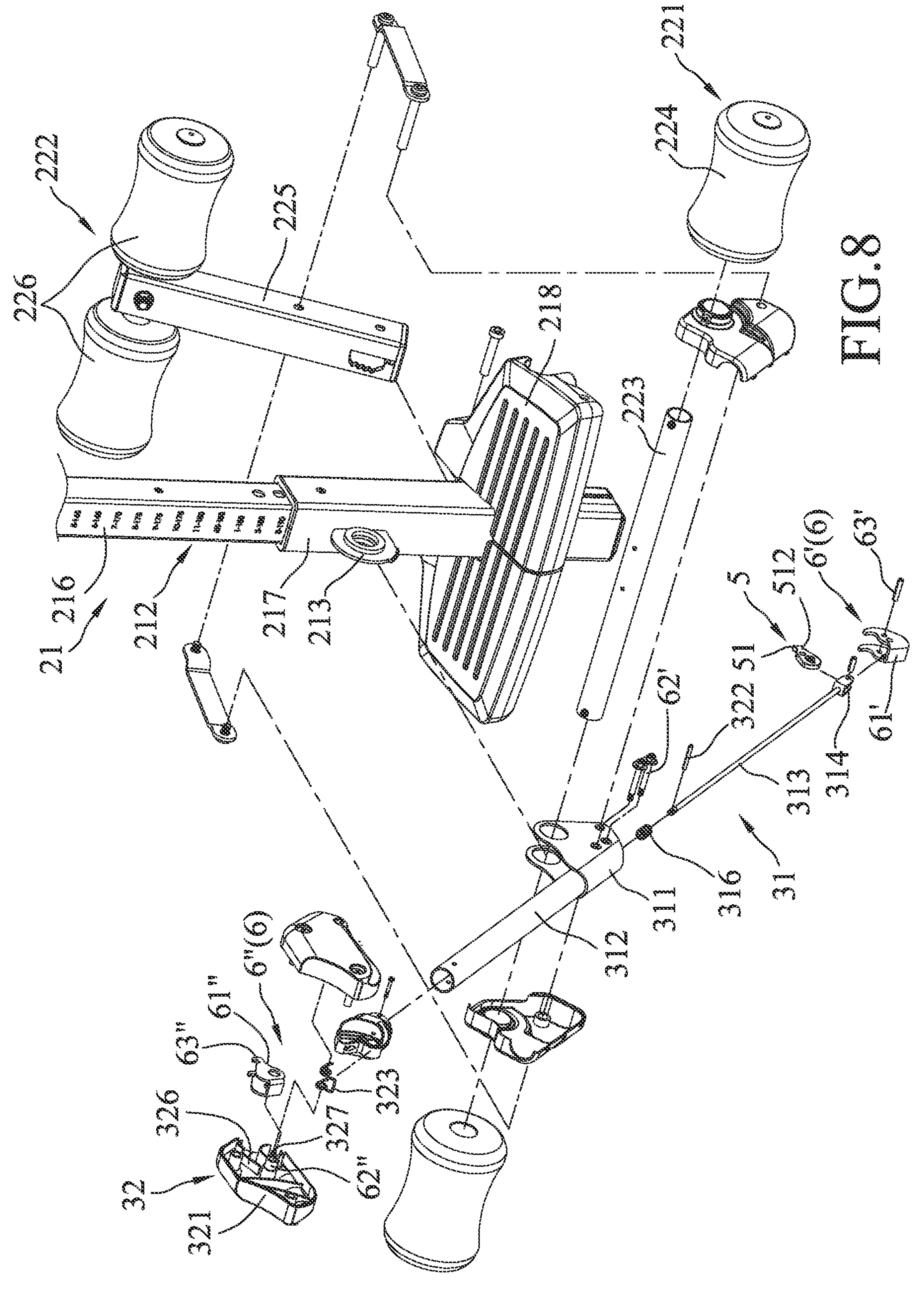
FIG. 8 is a fragmentary, exploded perspective view illustrating another embodiment of the inversion table according to the disclosure.
Figure 9:
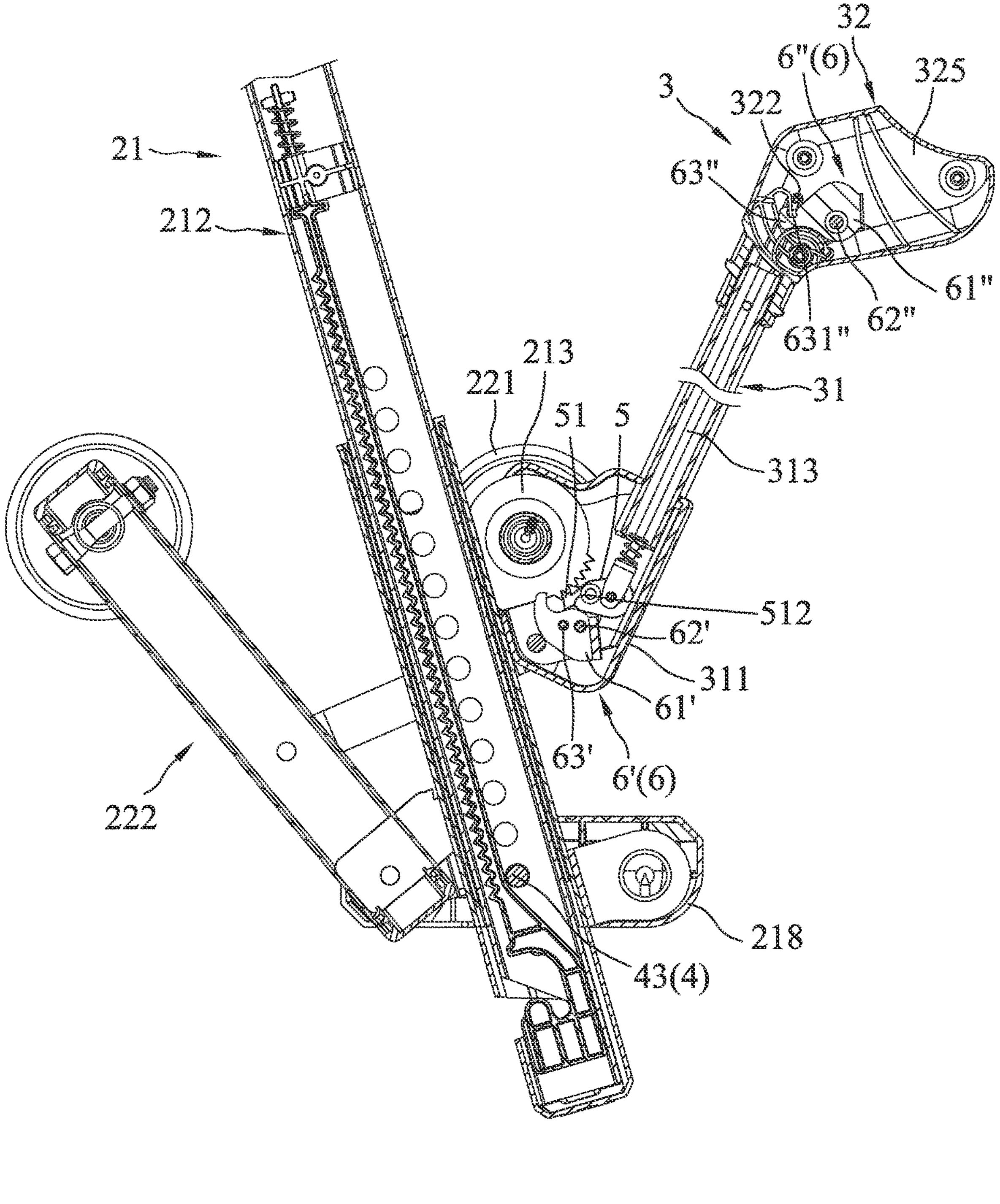
FIG. 9 is a fragmentary sectional view of the embodiment, illustrating when a safety locking mechanism is in a non-inversible state.
Figure 10:
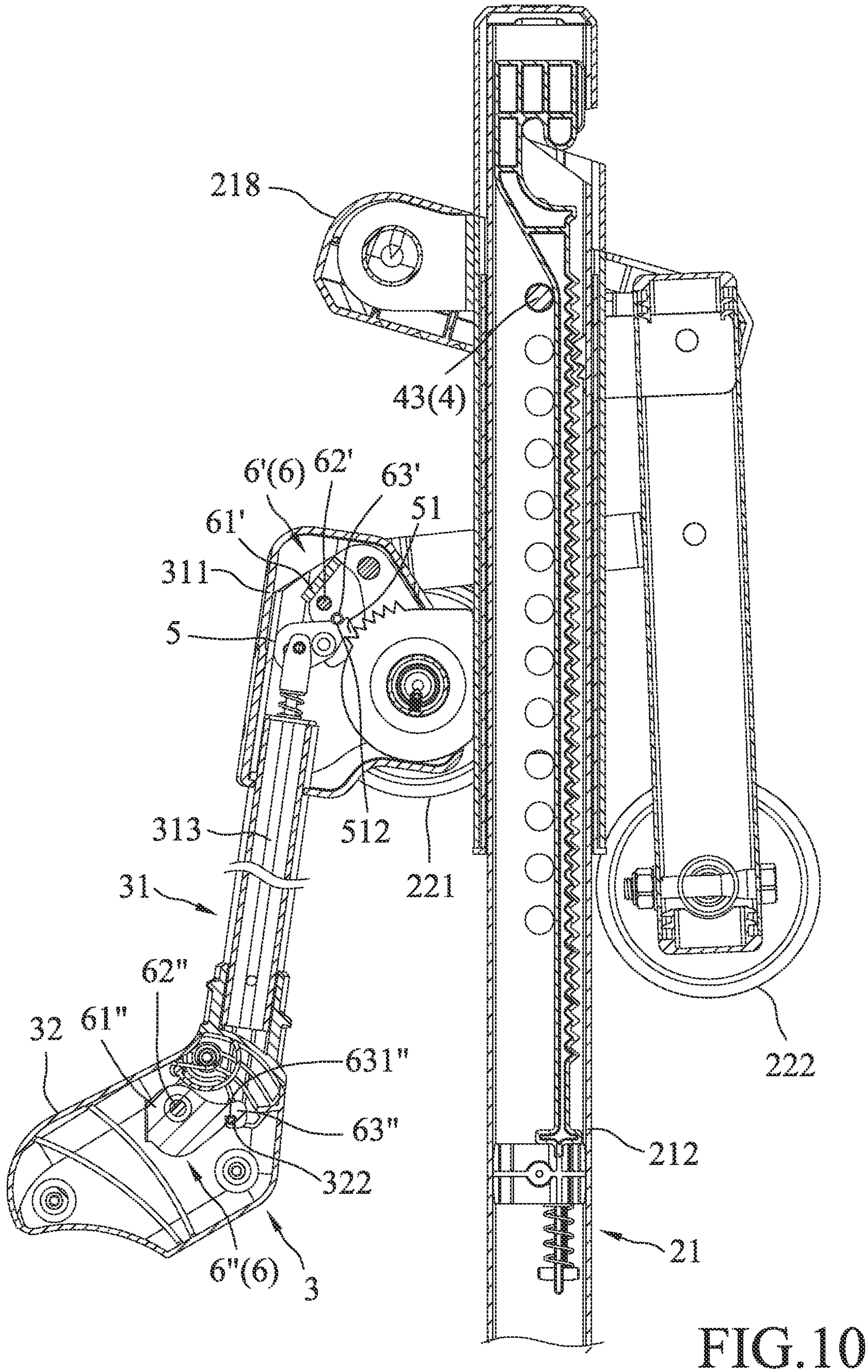
FIG. 10 is a fragmentary sectional view of the embodiment, illustrating when the safety locking mechanism is in an inversion state.

With reference to FIGS. 8 to 10, in another embodiment, the inversion table further includes at least one safety locking mechanism 6. The safety locking mechanism 6 is disposed on the operating unit 3. In such embodiment, the inversion table includes two safety locking mechanisms 6', 6" which are disposed at the operating assembly 31 and the handgrip assembly 32, respectively.

Each of the safety locking mechanisms 6', 6' includes a turnable latch 61', 61", a turning pin 62', 62" and a retaining portion 63', 63". The turning pin 62', 62" extends through and is connected with the turnable latch 61', 61" to permit turning of the turnable latch 61', 61" about the turning pin 62', 62". The retaining portion 63', 63' is disposed on the turnable latch 61', 61". The retaining portion 63', 63' is moved with turning of the turnable latch 61', 61" by means of gravity to retainingly engage with the operating unit 3 when the support table assembly 211 is turned to an inversion state.

Specifically, the turnable latch 61' of the first safety locking mechanism 6' is pivotably connected with the mounting member 311 of the operating assembly 31 by virtue of the turning pin 62' so as to be angularly moved about the turning pin 62'. The angular movement of the turnable latch 61' is less than 360 degrees. The retaining portion 63' is in the form of a crosspiece. The retaining member 5 of the operating assembly 31 has a notch 512 formed opposite to the meshing portion 51. When the support table assembly 211 is turned to the inversion state, as shown in FIG. 10, the retaining portion 63' is turned along with the turnable latch 61' by means of gravity and is retainingly engaged with the notch 512. With such structure, the meshing portion 51 is further prevented from disengagement from the teeth 200 for safety purposes.

The turnable latch 61" of the second safety locking mechanism 6" is pivotably connected with the handgrip housing 321 of the handgrip assembly 32 by virtue of the turning pin 62" which is securely received in the receiving space 325 of the handgrip housing 321 so as to be angularly moved about the turning pin 62". The angular movement of the turnable latch 61" is less than 360 degrees. The retaining portion 63" is in the form of a hook integrally formed with the turnable latch 61" and defines a slot 631', and is retainingly engageable with the positioning pin 322. With the retaining engagement, an undesired operation of the handgrip assembly 32 can be prevented.

It is noted that, in other various embodiments, only one of the safety locking mechanisms 6', 6" may be provided to further prevent an undesired operation of the operating unit 3 so as to avoid releasing of the rear feet holding assembly 222 during usage of the inversion table.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. An inversion table comprising:

a supporting stand;

a tilt inversion mechanism including an inversion unit and a feet holding unit, said inversion unit including a support table assembly and an extension assembly, said support table assembly being pivotally disposed on an upper portion of said supporting stand, said extension assembly being coupled with and extending from said support table assembly downwardly in a lengthwise direction, said feet holding unit including a front feet holding assembly and a rear feet holding assembly, said front feet holding assembly being securely and non-pivotably disposed on a lower portion of said inversion unit, said rear feet holding assembly being pivotably and movably connected to said inversion unit; and an operating unit including an operating assembly, said operating assembly being operably coupled with said front feet holding assembly, and being rotatable relative to said front feet holding assembly about a rotating axis at said front feet holding assembly to actuate said rear feet holding assembly to rotate and move toward said front feet holding assembly.

2. The inversion table as claimed in claim 1, wherein said operating assembly includes at least one linkage member which is pivotally connected between said front feet holding assembly and said rear feet holding assembly.

3. The inversion table as claimed in claim 2, wherein said extension assembly includes an inner tube, an outer tube, a fastening assembly and a feet retaining plate, said inner tube being securely connected with a lower end of said support table assembly, said outer tube being movably sleeved around said inner tube, said fastening assembly being disposed to releasably fasten said outer tube to said inner tube, said feet retaining plate being securely disposed on said outer tube, said operating assembly being disposed on said outer tube.

4. The inversion table as claimed in claim 1, wherein said inversion unit further includes a toothed wheel securely disposed on said extension assembly, said operating assembly being controllably operated to be in a state where said operating assembly meshes with said toothed wheel or a state where said operating assembly disengages from said toothed wheel.

5. The inversion table as claimed in claim 4, wherein said front feet holding assembly having a front shaft which serves as the rotating axis, said operating assembly includes a mounting member which is disposed at a lower end thereof and through which said front shaft extends, a sleeve tube which is securely connected to said mounting member, an elongated pull member which is movably disposed in said sleeve tube and which has upper and lower ends that extend outwardly of said sleeve tube, a pivoted portion which is disposed on said lower end of said pull member, a retaining member which is pivotably connected to said pivoted portion, and a biasing spring which is connected between said sleeve tube and said pivoted portion to bias said retaining member to mesh with said toothed wheel.

6. The inversion table as claimed in claim 5, wherein said retaining member has an elongated hole and a pivot pin, said pivot pin extending through said elongated hole and being connected to said pivoted portion.

7. The inversion table as claimed in claim 5, wherein said operating unit further includes a handgrip assembly, said handgrip assembly including a handgrip housing which is pivotably and operably disposed on an upper end portion of said sleeve tube and which has a spring-biased pivot portion, a positioning pin which is connected to said upper end of said pull member, and a returning spring which is disposed on said spring-biased pivot portion.

8. The inversion table as claimed in claim 7, further comprising at least one safety locking mechanism, said at least one safety locking mechanism including a turnable latch, a turning pin which is connected with said turnable latch to permit turning of said turnable latch about said turning pin, and a retaining portion which is disposed on said turnable latch, said retaining portion being moved with turning of said turnable latch by means of gravity to retainingly engage with said operating unit when said support table assembly is turned to an inversion state.

9. The inversion table as claimed in claim 8, wherein said turnable latch is pivotably connected with said mounting member of said operating assembly by virtue of said turning pin, said retaining portion being in form of a crosspiece, said retaining member having a notch, said retaining portion being retainingly engageable with said notch.

10. The inversion table as claimed in claim 8, wherein said turnable latch is pivotably connected with said handgrip housing of said handgrip assembly by virtue of said turning pin, said retaining portion being in form of a hook, and being retainingly engageable with said positioning pin.

11. The inversion table as claimed in claim 7, wherein said handgrip assembly further includes a rib disposed within said handgrip housing.

* * * * *